United States Patent [19]
Matsuo et al.

[11] Patent Number: 5,552,687
[45] Date of Patent: Sep. 3, 1996

[54] EMERGENCY ROBOT SHUTDOWN CIRCUIT

[75] Inventors: Yasuhiro Matsuo; Tomoki Ohya, both of Yamanashi; Yoshiki Hashimoto, Hadano, all of Japan

[73] Assignee: Fanuc, Ltd., Yamanashi, Japan

[21] Appl. No.: 322,151

[22] Filed: Oct. 13, 1994

[30] Foreign Application Priority Data

Oct. 29, 1993 [JP] Japan .................................. 5-271131

[51] Int. Cl.⁶ .................................................. G05B 9/02
[52] U.S. Cl. ...................... 318/563; 318/560; 318/568.1; 318/568.24; 318/592; 318/626; 901/49
[58] Field of Search ................................ 318/563, 560, 318/568, 568.24, 592, 626; 901/49; 335/68

[56] References Cited

U.S. PATENT DOCUMENTS

| | | |
|---|---|---|
| 4,469,993 | 9/1984 | Swanson et al. ................ 318/592 X |
| 4,672,279 | 6/1987 | Hosokawa et al. ................ 318/568 |
| 5,323,309 | 6/1994 | Taylor et al. ................ 318/563 X |

Primary Examiner—William M. Shoop, Jr.
Assistant Examiner—Karen Masih
Attorney, Agent, or Firm—Staas & Halsey

[57] ABSTRACT

An emergency robot shutdown circuit reliably stops a movable component of a robot which has suffered an overtravel condition. The emergency robot shutdown circuit has three relays, and detects an overtravel condition of the robot with a dog located in a limit position of a normal operation range of the movable component of the robot to command an emergency shutdown of the robot. The second relay holds an overtravel signal which is outputted from a detecting circuit. A switching transistor is connected parallel to a make contact of the second relay, and an overtravel cancel switch is connected parallel to another make contact of the second relay. The base of the switching transistor is supplied with an overtravel unlatching pulse in synchronism with the closing of the overtravel cancel switch. The third relay, which is connected in series with the other make contact of the second relay, has three make contacts which make up a power cutoff circuit. These three make contacts are turned off only when the third relay is de-energized.

8 Claims, 4 Drawing Sheets

EMERGENCY ROBOT SHUTDOWN CIRCUIT

BACKGROUND OF THE INVENTION

1. Field of the Invention

The present invention relates to an emergency robot shutdown circuit, and more particularly to an emergency robot shutdown circuit for reliably stopping a movable robot component which has traveled beyond a certain range or suffered an overtravel condition.

2. Description of the Related Art

Robots that are program-controlled by numerical control apparatus are equipped with various emergency shutdown circuits for better safety in working environments. One such emergency shutdown circuit is designed to operate when it detects an overtravel condition of a robot. In the case where the emergency shutdown circuit is combined with a shaft rotatable on a base, such an overtravel condition is established by the emergency shutdown circuit as a certain inoperable angular range in which the shaft is not rotatable. The overtravel range is not necessarily associated with a rotatable shaft. Generally, an emergency robot shutdown circuit is arranged such that if a movable shaft is about to move beyond a normal operation range, then a limit switch presses a dog, forcibly shutting off the supply of power to a robot moving mechanism thereby to stop the robot.

In recent years, moving speeds or rotational speeds which are given as command speeds to robots have been increasing for higher efficiency. It is more and more difficult to reliably stop a movable robot component in an overtravel condition merely with an overtravel signal which is generated by a limit switch when the movable robot component has traveled beyond a normal operation range.

FIG. 3 of the accompanying drawings shows in perspective a robot having a rotatable shaft 3 on a fixed base. A limit switch 1 which defines an inoperable angular range is fixedly mounted on the base. A dog 2 of a certain length is mounted on the rotatable shaft 3 for engaging the limit switch 1 to cause the limit switch 1 to output an overtravel signal.

FIG. 4 of the accompanying drawings shows a conventional emergency robot shutdown circuit.

As shown in FIG. 4, a dog for detecting an overtravel condition is located in a limit position of an operable range of a movable component of a robot 10. The dog and the limit switch 1 jointly serve as a detecting circuit 11 for producing an overtravel signal. When the limit switch 1 presses the dog and is turned off thereby, a relay R4 is de-energized, opening a make contact (normally open) r4 thereof thereby to de-energize a relay R5 which is connected in series with the make contact r4.

A teach control console 12 has an emergency shutdown button connected in series with the make contact r4. Therefore, the relay R5 can also be de-energized when the emergency shutdown button is pressed. An overtravel cancel switch 13 is connected parallel to the make contact r4. The relay R5 can be energized when the overtravel cancel switch 13 is closed.

When an overtravel signal is detected, the relays R4, R5 are simultaneously de-energized, opening make contacts r5a, r5b, r5c of the relay R5 in a power cutoff circuit 14. Now, a power supply 15 and an amplifier 16 for actuating the robot 10 are disconnected from each other, thus shutting off the robot 10 in case of emergency. When the overtravel cancel switch 13 is closed, the power is supplied to the movable component of the robot 10 to return the same from the overtravel condition even if the limit switch 1 is pressing the dog.

In the event that the movable component of the robot 10 moves beyond the dog, however, the relays R4, R5 are energized again, and the power is supplied to the movable component of the robot 10 which is in the inoperable range before the overtravel cancel switch 13 is closed. Stated otherwise, even after the movable component of the robot 10 has entered the inoperable range, the movable component keeps moving due to a delay of the response to the overtravel signal or an inertia of the movable component. As a result, the movable component of the robot 10 is not reliably stopped only with the overtravel signal produced by the detecting circuit 11.

The above problem can be solved by elongating the dog depending on the speed of movement of the movable component of the robot 10, thereby maintaining a certain period of time in which the overtravel signal is sustained. Since the length of the dog limits the normal operation range of the movable component of the robot 10, however, the length of the dog is physically limited by the size of the robot 10. If the command speed for moving the robot 10 is increased, then the movable component of the robot 10 cannot reliably be stopped when in an overtravel condition.

SUMMARY OF THE INVENTION

It is therefore an object of the present invention to provide an emergency robot shutdown circuit which is capable of reliably stopping a movable robot component which has suffered an overtravel condition.

To achieve the above object, there is provided in accordance with the present invention an emergency robot shutdown circuit for detecting an overtravel condition of a robot with a dog located in a limit position of a normal operation range of a movable component of the robot to command an emergency shutdown of the robot, comprising detecting means for detecting an overtravel condition of the movable component of the robot thereby to output an overtravel signal, overtravel latching means for holding the overtravel signal and inhibiting power from being supplied to the movable component of the robot, and overtravel unlatching means for unlatching the overtravel signal held by the overtravel latching means with an unlatching command which is issued when the movable component of the robot returns to the normal operation range thereof.

When the movable component of the robot moves over and past the dog, the detecting means outputs an overtravel signal. Once the overtravel signal is outputted from the detecting means, the overtravel signal is held by the overtravel latching means, for reliably inhibiting the robot from operating in an overtravel condition.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will hereinafter be described with reference to the drawings.

Figure 1:
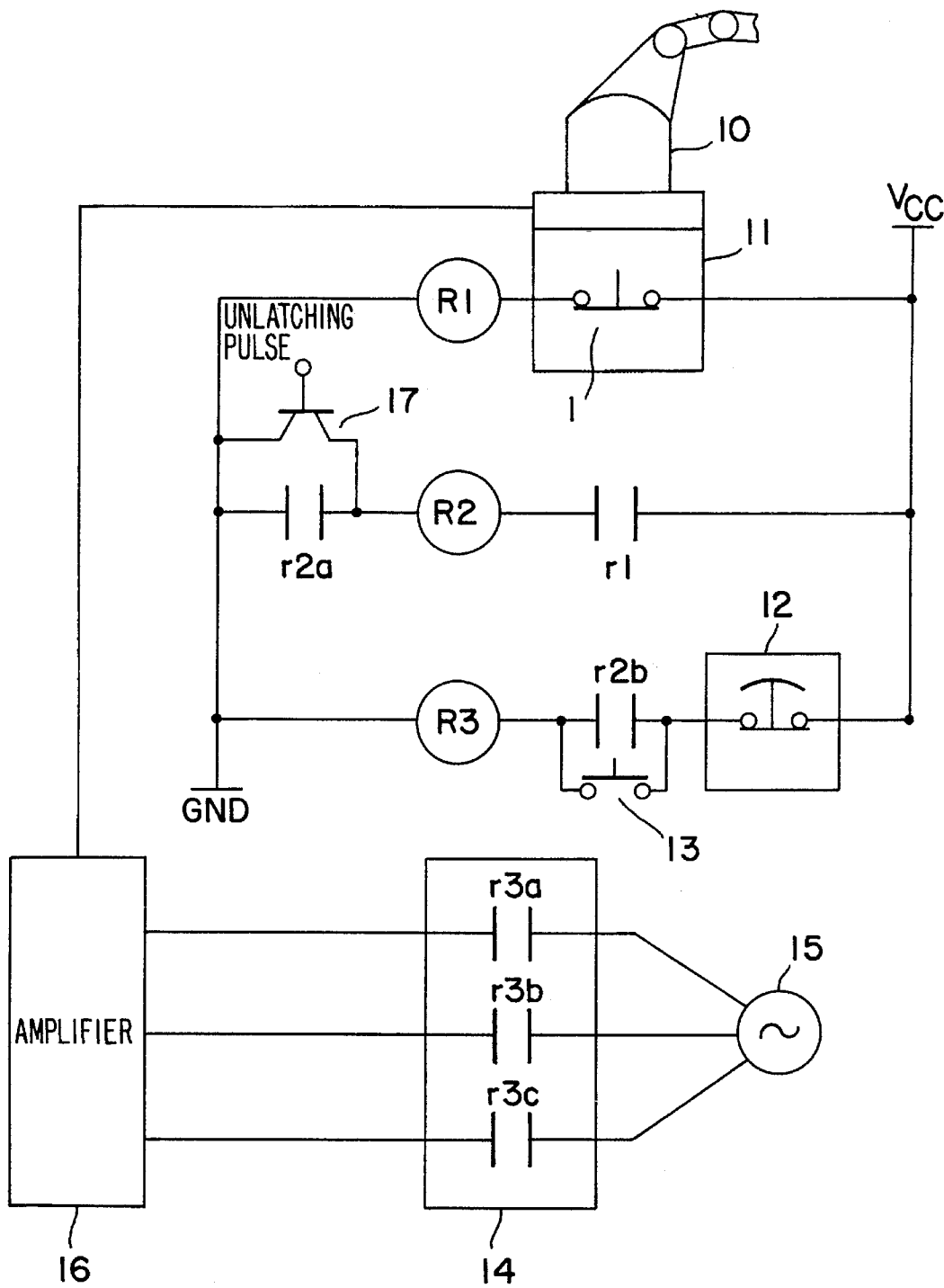
FIG. 1 is a circuit diagram, partly in block form, of an emergency robot shutdown circuit according to the present invention.
Figure 4:
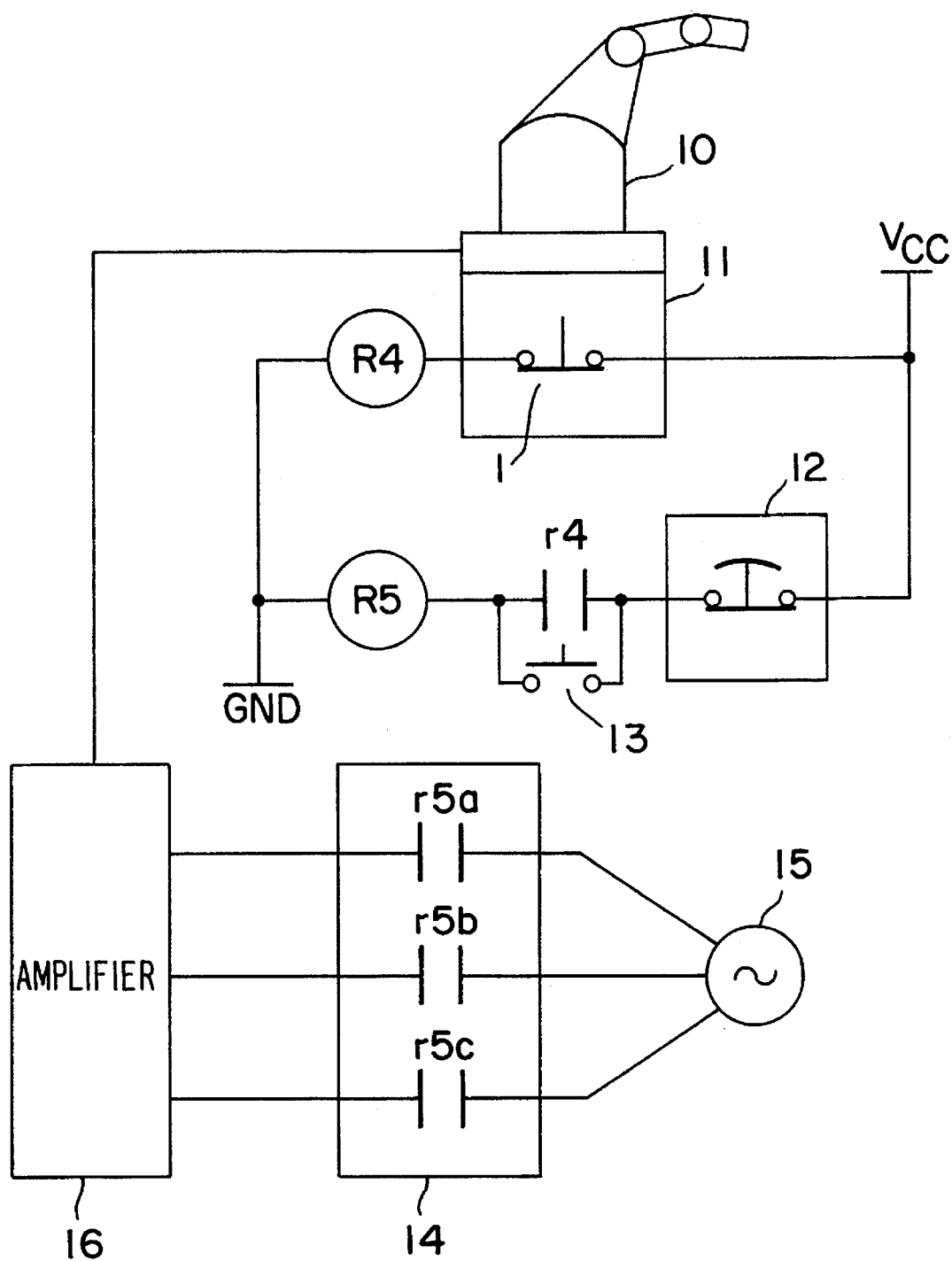
FIG. 4 is a circuit diagram, partly in block form, of a conventional emergency robot shutdown circuit.

As shown in FIG. 1, an emergency robot shutdown circuit according to the present invention includes a detecting circuit 11 for detecting an overtravel condition of a robot 10, a teach control console 12 having an emergency shutdown button, an overtravel cancel switch 13, a power cutoff circuit 14, a power supply 15, and an amplifier 16. These elements are identical to those shown in FIG. 4, and will not be described in greater detail below. The emergency robot shutdown circuit according to the present invention differs from the conventional emergency robot shutdown circuit shown in FIG. 4 with respect to the contacts of relays R1, R2, R3 which jointly serve as a signal transmission system for controlling the power cutoff circuit 14.

The relay R1 which is connected in series to the detecting circuit 11 has a make contact r1, and the relay R2 which is of the self-holding type is connected in series with the make contact r1. The relay R2 has a make contact r2a and a make contact r2b. The emergency shutdown button of the teach control console 12 and the relay R3 are connected in series with the make contact r2b. The power cutoff circuit 14 has make contacts r3a, r3b, r3c of the relay R3.

The signal transmission system according to the present invention differs from the conventional emergency robot shutdown circuit which includes the two relays R4, R5 in that the signal transmission system is composed of the three relays R1, R2, R3, and an overtravel signal outputted from the detecting circuit 11 is held by the second relay R2. A switching transistor 17 is connected parallel to the make contact r2a of the relay R2, and the overtravel cancel switch 13 is connected parallel to the make contact r2b. The base of the switching transistor 17 is supplied with an overtravel unlatching pulse in synchronism with the closing of the over-travel cancel switch 13.

The make contacts r3a, r3b, r3c which make up the power cutoff circuit 14 are turned off when the relay R3 connected in series with the make contact r2b is de-energized. The relay R3 may also be de-energized by the emergency shutdown button of the teach control console 12 to shut off the robot 10 in case of emergency.

Figure 2:
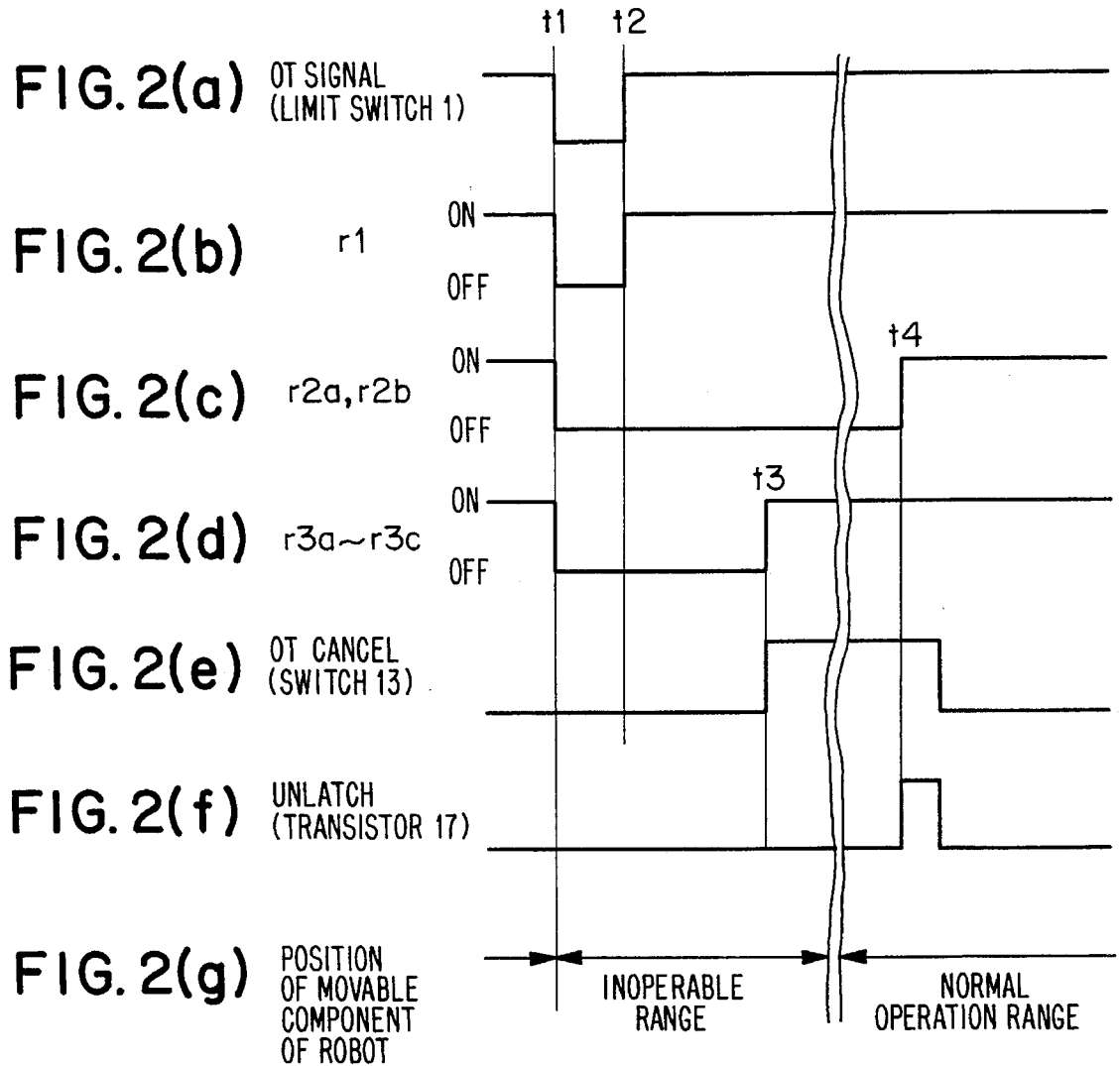
FIG. 2 is a timing chart illustrative of operation of the emergency robot shutdown circuit.
Figure 3:
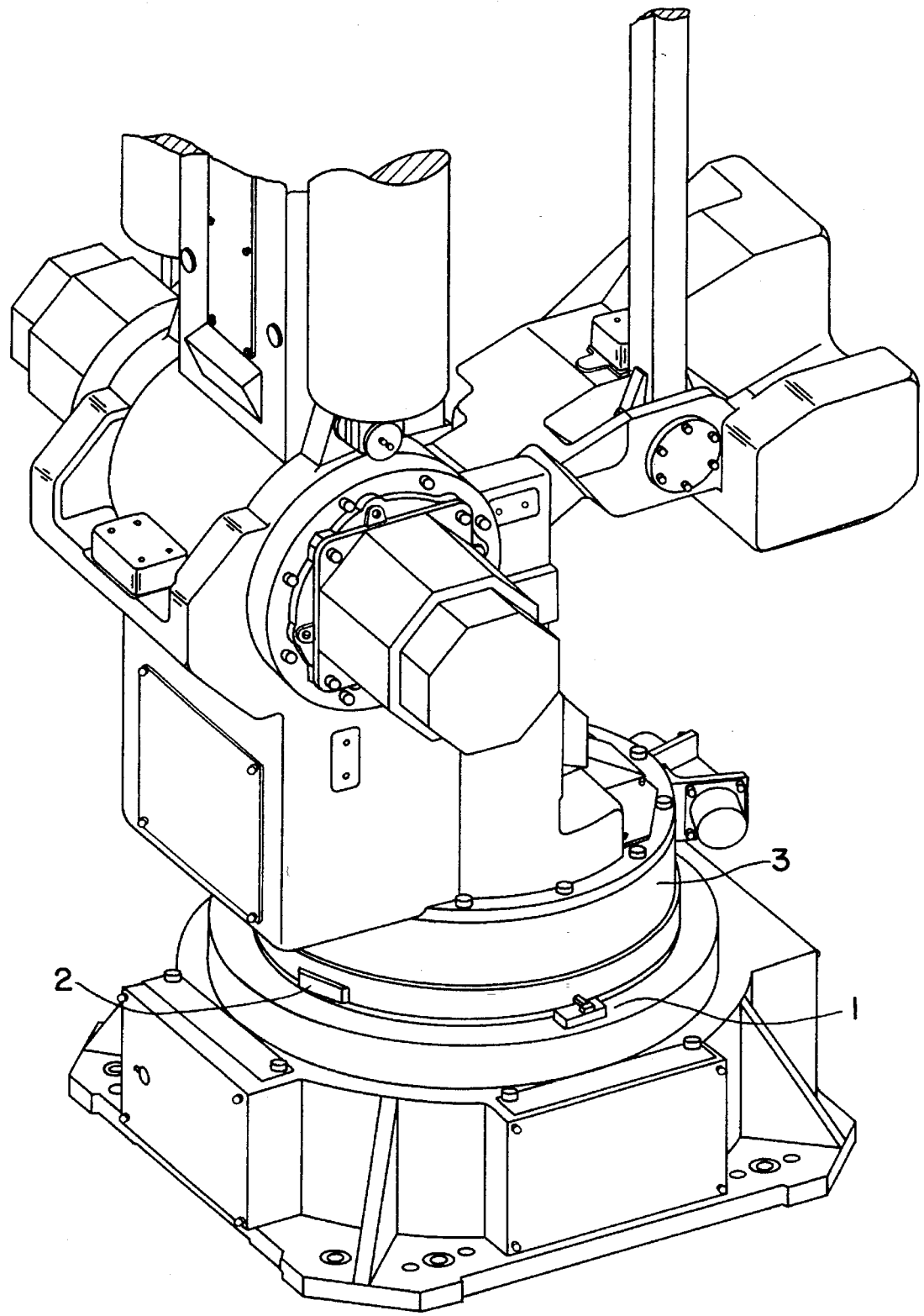
FIG. 3 is a perspective view of a robot having a rotatable shaft.

Operation of the emergency robot shutdown circuit according to the present invention will be described below with reference to the timing chart in FIG. 2.

It is assumed that an overtravel signal is outputted, detecting an overtravel condition of the robot 10 at a time t1. Insofar as the limit switch 1 is pressing the dog, the relay R1 is de-energized, opening the make contact r1. Therefore, the relay R2 is de-energized at the same time that the relay R1 is de-energized at the time t1. The make contacts r2a, r2b are turned off from the time t1 on so that relay R3 is de-energized. The make contacts r3a, r3b, r3c of the power cutoff circuit 14 are then turned off, inhibiting the supply of power to the robot 10.

When the limit switch 1 moves over and past the dog at a time t2, the overtravel signal is eliminated. At this time, the relay R1 is energized, turning on the make contact r1. Since, however, the make contact r2a remains turned off, the relay R2 is not energized. As a result, the overtravel signal is held by the relay R2.

The make contacts r2a, r2b remain turned off, and the make contacts r3a, r3b, r3c of the power cutoff circuit 14 also remain open. Therefore, once an overtravel signal is issued, the movable component of the robot 10 remains disabled not only while the limit switch 1 is pressing the dog, but also until the overtravel cancel switch 13 is closed to forcibly energize the relay R3.

According to the conventional emergency robot shutdown circuit, the power may be supplied to the robot before the overtravel cancel switch 13 is closed even if the movable component of the robot is in the inoperative range. Therefore, it has been necessary to incorporate some means for preventing the movable component from moving past the dog even at higher speeds of operation of the robot 10.

According to the present invention, as long as the period of time (t1–t2) for which the overtravel signal is outputted is longer than the reset time of the relay R1, the overtravel signal is held by the relay R2. Consequently, the robot 10 is reliably inhibited from operating once it enters the inoperable range.

When an overtravel cancel signal is inputted from the overtravel cancel switch 13 at a time t3, the power is supplied to the movable component of the robot 10 in the overtravel condition, thereby returning the movable component of the robot 10 back into its normal operation range.

When the robot 10 is confirmed as having reached the normal operation range at a time t4, the overtravel cancel switch 13 is opened or turned off, and an overtravel unlatching pulse is applied to turn on the transistor 17 to unlatch the overtravel signal.

With the arrangement of the present invention, since an overtravel signal is held even when the movable component of the robot has moved over and past the dog, the emergency robot shutdown circuit is able to reliably stop the movable component of the robot which has suffered an overtravel condition.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An emergency robot shutdown circuit for detecting an overtravel condition of a robot with a dog located in a limit position of a normal operation range of a moveable component of the robot, to command an emergency shutdown of the robot, comprising:

detecting means for detecting an overtravel condition of the moveable component of the robot and outputting an overtravel signal in response thereto;

overtravel latching means for receiving and latching said overtravel signal output from said detecting means and inhibiting power from being supplied to the moveable component of the robot in response to the overtravel signal, and for supplying power to the moveable component of the robot in response to an unlatching command; and overtravel unlatching means for unlatching the overtravel signal held by said overtravel latching means by transmitting the unlatching command to the overtravel latching means and for supplying power to the movable component of the robot in response to a received overtravel cancel signal.

2. An emergency robot shutdown circuit according to claim 1, wherein said overtravel latching means comprises:

a first contact connected between a power supply and ground, said first contact being disconnected in response to the overtravel signal; and a self-holding relay connected in series with the first contact; and a second contact connected in series with the first contact;

wherein a switching transistor is connected in parallel across the second contact and said self-holding relay holds the overtravel signal output from the detecting means.

3. An emergency robot shutdown circuit according to claim 2, wherein said overtravel latching means comprises:

a power cutoff circuit for controlling power supplied to the movable component of the robot in response to the overtravel signal held by said self-holding relay.

4. An emergency robot shutdown circuit for controlling operation of a robot by disconnection of power supplied thereto upon movement of the robot from a normal operating range to a limit position comprising:

a detecting circuit responsive to movement of the robot into the limit position and disconnecting a first power line in response thereto;

a first relay, connected to the first power line, which becomes deenergized and disconnects a second power line upon disconnection of the first power line;

a second relay, connected to the second power line, which becomes deenergized and disconnects a third power line upon disconnection of the second power line;

a latch connected to the second relay and the second power line which maintains the disconnection of the second power line upon return of the robot to the normal operating range from the limit position and subsequent reconnection of the first power line by the detecting circuit;

a third relay, connected to the third power line, which becomes deenergized and disconnects the power supplied to the robot upon disconnection of the third power line; and a cancel switch connected to the third power line which energizes the third relay through reconnection of the third power line in response to switching thereof.

5. The emergency robot shutdown circuit according to claim 4 wherein the cancel switch transmits an unlatching pulse to the latch in response to switching thereof to reconnect the second power line and thereby energize the second relay.

6. A method for operation of a robot in response to movement of a dog into contact with a limit switch, said method comprising the steps of:

detecting an overtravel condition of a robot beyond a normal operation range in response to movement of the dog into contact with the limit switch;

inhibiting connection of a power supply to the robot in response to the detected overtravel condition;

continuing to inhibit connection of the power supply to the robot when the dog is removed from contact with the switch; and restoring power from the power supply to the robot in response to an overtravel unlatching signal.

7. The method for operation of a robot according to claim 6, wherein said inhibiting step further comprises:

deenergizing a first relay along a first signal line in response to the detected overtravel condition;

deenergizing a second relay along a second signal line in response to the deenergization of the first relay;

latching the second relay along the second signal line during deenergization thereof;

and deenergizing a third relay along a third signal line in response to the deenergization of the second relay to disconnect the robot from the power supply.

8. The method for operation of a robot according to claim 7, wherein said restoring step further comprises:

moving the robot such that the dog is removed from contact with the limit switch to thereby remove the overtravel condition;

reenergizing the first relay in response to the removal of the dog from contact with the limit switch;

reenergizing the third relay in response to removal of the overtravel condition and unlatching the second relay to thereby reenergize the second relay.

\* \* \* \* \*